United States Patent
Cassidy

(10) Patent No.: US 9,059,590 B2
(45) Date of Patent: Jun. 16, 2015

(54) UNIVERSAL BATTERY CHARGER SYSTEM AND METHOD

(71) Applicant: Timothy M. Cassidy, Plymouth, MN (US)

(72) Inventor: Timothy M. Cassidy, Plymouth, MN (US)

(73) Assignee: BBY Solutions, Inc., Richfield, MN (US)

( * ) Notice: Subject to any disclaimer, the term of this patent is extended or adjusted under 35 U.S.C. 154(b) by 307 days.

(21) Appl. No.: 13/777,075

(22) Filed: Feb. 26, 2013

(65) Prior Publication Data

US 2014/0239881 A1 Aug. 28, 2014

(51) Int. Cl.
*H02J 7/00* (2006.01)
*G06K 19/07* (2006.01)

(52) U.S. Cl.
CPC ........... *H02J 7/0042* (2013.01); *G06K 19/0723* (2013.01); *H02J 7/007* (2013.01); *H02J 7/0027* (2013.01)

(58) Field of Classification Search
None
See application file for complete search history.

(56) References Cited

U.S. PATENT DOCUMENTS

| | | | |
|---|---|---|---|
| 6,100,664 A | 8/2000 | Oglesee et al. | |
| 6,504,343 B1 * | 1/2003 | Chang | 320/124 |
| 6,507,172 B2 | 1/2003 | Sherman | |
| 6,614,206 B1 * | 9/2003 | Wong et al. | 320/136 |
| 7,045,989 B2 * | 5/2006 | Sakakibara et al. | 320/106 |
| 7,271,568 B2 * | 9/2007 | Purdy et al. | 320/106 |
| 7,605,707 B2 * | 10/2009 | German et al. | 340/572.8 |
| 7,643,797 B2 | 1/2010 | Ban et al. | |
| 7,657,763 B2 * | 2/2010 | Nelson et al. | 713/300 |
| 7,948,208 B2 * | 5/2011 | Partovi et al. | 320/108 |
| 8,261,100 B2 | 9/2012 | Paniagua, Jr. et al. | |
| 8,442,792 B1 * | 5/2013 | Elberbaum | 702/107 |
| 8,554,033 B2 * | 10/2013 | Kewitsch | 385/101 |
| 2007/0072474 A1 * | 3/2007 | Beasley et al. | 439/332 |
| 2008/0007212 A1 * | 1/2008 | Theytaz et al. | 320/107 |
| 2009/0212791 A1 | 8/2009 | Cresswell et al. | |
| 2011/0031821 A1 * | 2/2011 | Greene et al. | 307/154 |
| 2011/0097925 A1 * | 4/2011 | Caveney et al. | 439/488 |
| 2011/0127954 A1 | 6/2011 | Walley et al. | |
| 2011/0291813 A1 * | 12/2011 | Jansma | 340/10.5 |
| 2012/0109403 A1 * | 5/2012 | Shelton et al. | 700/297 |

FOREIGN PATENT DOCUMENTS

EP 2328223 A1 1/2011

* cited by examiner

*Primary Examiner* — Leigh Garbowski
(74) *Attorney, Agent, or Firm* — Beck Tysver Evans PLLC

(57) ABSTRACT

A system and method for a universal battery charger is presented. An RFID tag on a battery-powered device communicates battery information to the charger to allow the charger to optimally charge the battery. The battery charger has a charging cord with a charge plug at an end of the cord to connect the charging cord to a port on a device. The charging cord contains an RFID antenna near the end of the cord. The RFID antenna has a limited reading range. When the charge plug is inserted into a charging port on a battery-powered device, an RFID reader uses the RFID antenna to read the information stored on the RFID tag. Based on the RFID tag information, a charging selector selects a current and voltage to be output to charge the device through the device port.

19 Claims, 3 Drawing Sheets

Fig. 2

| ID | CURRENT | VOLTAGE | ALGORITHM |
|---|---|---|---|
| 12345 | 2 | 3 | A |
| 23456 | 5 | 10 | B |
| 34567 | 3 | 7 | C |

MEMORY

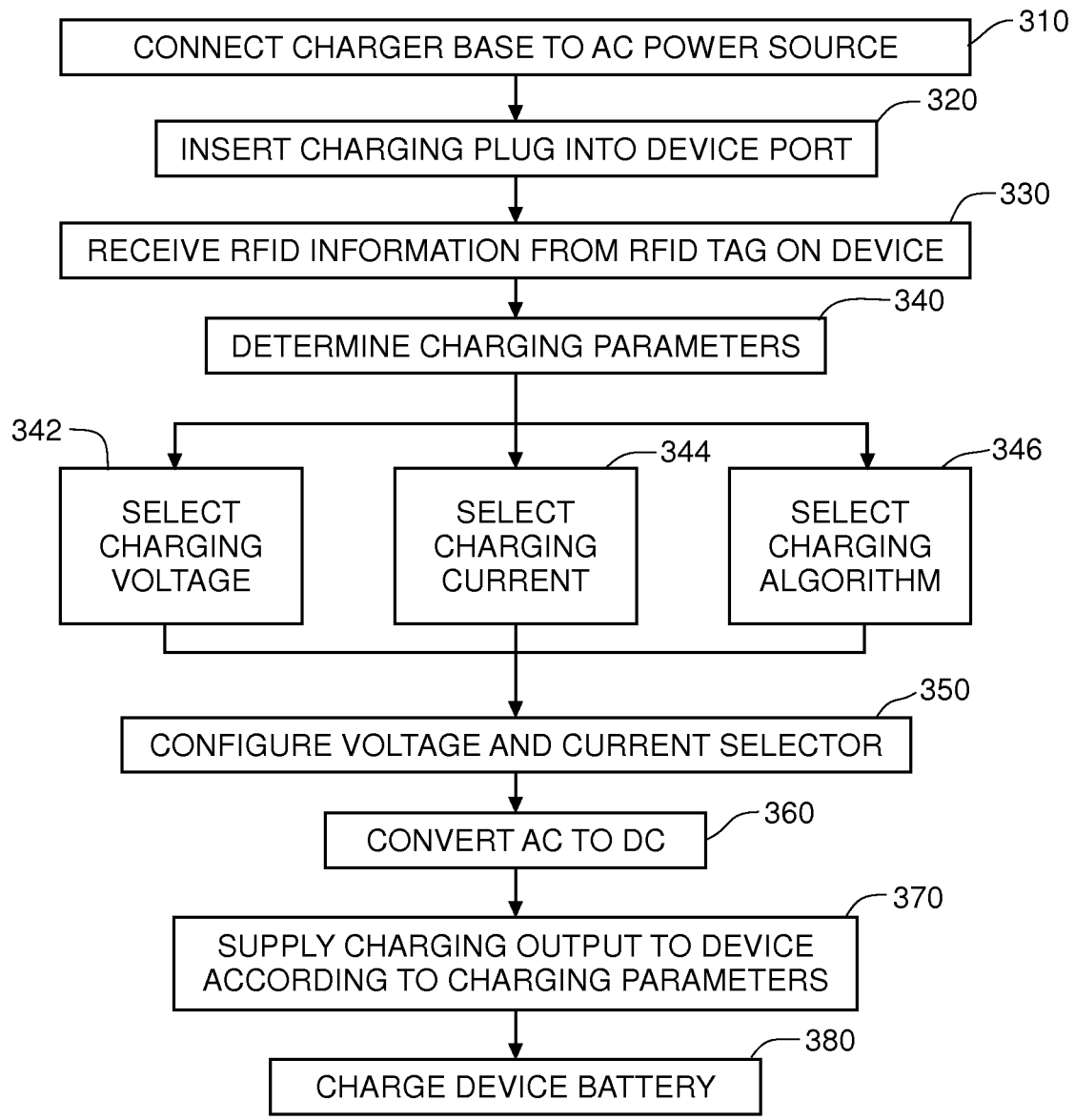

UNIVERSAL BATTERY CHARGER SYSTEM AND METHOD

FIELD OF THE INVENTION

The present application relates to the field of chargers for battery-powered devices. More particularly, the described embodiments relate to a universal battery charger system using an RFID tag to communicate an optimal charging configuration for a rechargeable battery in the device.

BACKGROUND

Rechargeable batteries come in many types. Different batteries using different chemical materials require different methods of recharging. Current battery chargers are designed to be used for only one type of battery. For example, a lithium-ion battery requires a different battery charger than a nickel-cadmium battery. Each battery charger is configured only for one purpose, such as to maintaining a constant voltage, a constant current, or a predetermined charging algorithm that may vary the voltage or current. More sophisticated battery chargers may use a charging algorithm to charge a battery quickly at first, then slow down the rate of charge as the battery nears full charge.

SUMMARY

One embodiment of the present invention provides a universal battery charger using RFID identification to choose a charging configuration for a rechargeable battery-powered device. The universal battery charger can be used for multiple different battery types. An RFID tag on a battery-powered device contains information associated with an optimal charging configuration to recharge the device battery. The universal battery charger uses an RFID reader to read the RFID tag on the device, then selects a voltage and current, and then uses the selected voltage and current configuration to charge the battery associated with the RFID tag. In a preferred embodiment the universal battery charger has a charging cord with an RFID antenna on the end of the charging cord to read an RFID tag for a battery in a battery-powered device.

BRIEF DESCRIPTION OF THE DRAWINGS

FIG. 2 is a schematic diagram showing a memory storing a look-up table.

FIG. 3 is a flow chart showing a method of charging a battery.

DETAILED DESCRIPTION

Figure 1:
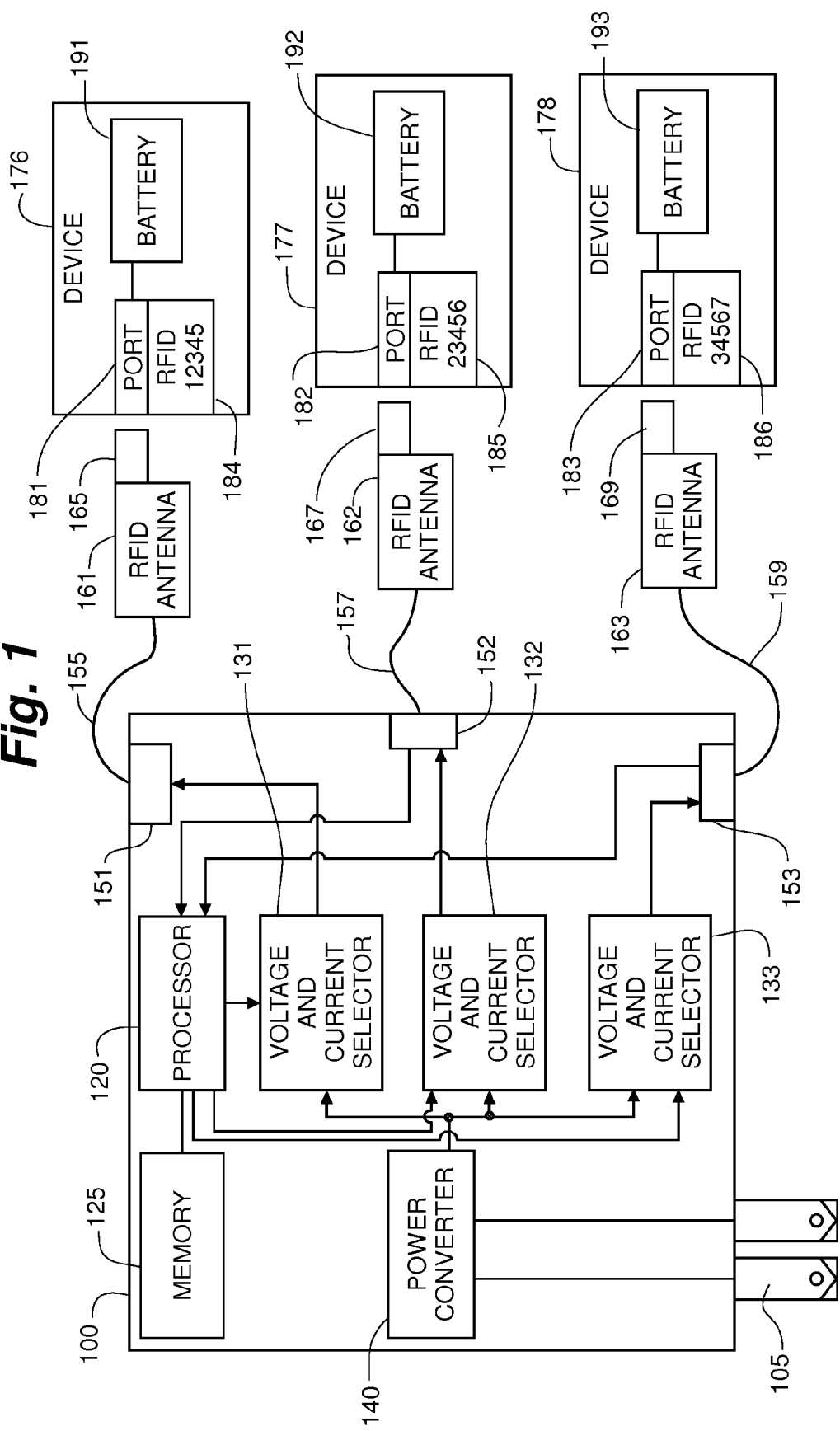
FIG. 1 is a schematic diagram of a universal battery charger system.

FIG. 1 shows a schematic diagram of a universal battery charging system. A battery-powered device 176 in the system is powered by a rechargeable battery 191. The device 176 has a charging port 181 to recharge the battery 191. The device 176 has an RFID tag 184 storing information about the device battery 191. In a preferred embodiment, RFID tag 184 is a passive RFID tag that does not require electricity to function. A passive RFID tag requires an active RFID reader to send an electronic signal to interrogate the passive RFID tag. Passive RFID tags are advantageous in the present application because of their small size and low cost. In an alternative embodiment the RFID tag 184 could be an active RFID tag. The RFID tag 184 may be attached directly to the device 176, or it may alternatively be attached to battery 191.

The battery charging system may support charging of multiple devices. Devices 177 and 178 have ports 182 and 183, batteries 192 and 193, and RFID tags 185 and 186, which are similar to the corresponding features of device 176.

The RFID tags 184-186 of devices 176-178 may be low-frequency tags that respond to radio frequencies in the range of 120-150 kHz. An RFID tag reader must be approximately 10 centimeters or less from a low-frequency tag in order to read the tags 184-186. In an alternative embodiment the RFID tags 184-186 could be high-frequency tags which respond to radio frequencies of approximately 13.56 MHz. The high-frequency band tags can be read at a distance of up to one meter.

A battery charger base 100 houses electronics components to provide power to device 176. The universal battery charger base 100 includes prongs 105 to plug the base 100 into a standard alternating current (AC) electrical socket. The AC electrical socket may be a 120-volt or 230-volt grounded or ungrounded socket used in many electrical applications, or may be some other type of socket compatible with prongs 105.

A power converter 140 receives AC current and converts the AC current to direct current (DC). The power converter 140 may be a standard power supply as known in the art. The power converter 140 provides DC to one or more voltage and current selectors 131, 132, and 133. The voltage and current selectors 131-133 provide charging output to charge a battery of an external battery-powered device. In the preferred embodiment, each voltage and current selector 131-133 is capable of producing a variable range of voltage and current. In an alternative embodiment, each voltage and current selector 131-133 may be constrained to output only one particular voltage or current.

The charging base 100 has a charging cord 155 that connects to charging components within the base 100 through a node 151, where data signals and charging current wires are split. Charging cord 155 terminates in a charging plug 165. The charging plug 165 may be a simple power connector tip to transfer current to a battery 191. Plug 165 may alternatively be a connector for both electrical charging and data transfer such as a USB plug connector or other similar connector. Other types of charging plugs are known and will be evident to one skilled in the art.

The charging base 100 may also provide two or more additional charging cords, such as cords 157 and 159. Charging plugs 167 and 169 at the end of charging cords 157 and 159 may be the of the same size, shape, and type as plug 165, or may have different connectors, allowing the battery charger 100 to be compatible with many different ports 181-183.

The charging cord 155 has an RFID antenna 161 near an end of the charging cord 155 and proximal to the plug 165. In one embodiment the RFID antenna 161 is an antenna for a low frequency RFID, and can read an RFID tag 184 only at a close distance (e.g., 10 centimeters or less). This close-distance limitation is advantageous in a system using multiple devices 176-178 with different batteries 191-193 each having different charging configuration requirements. By allowing each antenna 161-163 to only read close-by RFID tags 184-186, and by locating the antennas 161-163 on the cords 155-159 near the plugs 165-169, this configuration reduces or eliminates the possibility of that an antenna 161 associated with a plug 165 connected to a first device 176 will accidentally read the information from an RFID tag 185 on a second device 177.

In an alternative embodiment the antenna 161 may be a high-frequency RFID antenna, and can read an RFID tag 184 at a distance of up to one meter. The high-frequency RFID antenna is advantageous in a system that includes only one charging cord 155 and one antenna 161 to charge a single device 176.

RFID antenna 161 reads RFID tag 184 when the charging plug 165 is inserted into port 181. RFID tag 184 contains information related to an optimal charging configuration to charge battery 191. In one embodiment the tag information in RFID tag 184 specifies a current, a voltage, or a charging algorithm for charging battery 191. The information stored in RFID tag 184 is sent from the RFID antenna 161 to a processor 120 within the charging base 100. The processor 120 then determines an optimal charging voltage, charging current, and/or charging algorithm for the battery 191 based on information from RFID tag 184.

The processor 120 sends charging instructions to voltage and current selector 131. The selector 131 selects a charging voltage and charging current according to the selected algorithm. The selector 131 produces a charging output that is sent through charging cord 155 to port 181. The battery 191 within device 176 is then charged in accordance with the RFID information on RFID tag 184.

In an alternative embodiment, the RFID tag 184 contains an identifier such as an identification number, serial number, or a designated code. The identifier or code may additionally signify one or more of a battery brand, a battery chemistry, a battery voltage, or other characteristics. In this embodiment the processor 120 accesses a memory 125 in charging base 100 to determine the correct charging parameters for battery 191. FIG. 2 shows the memory 125 having a look-up table 200 containing information for charging multiple different types of batteries. The RFID tag information from RFID tag 184 is listed in the table as an identifier 201. Each identifier 201 is linked to one or more charging parameters, such as a charging current 210, a charging voltage 220, and charging algorithm 230. The information in table 200 is used by processor 120 to instruct voltage and current selector 131 to select a charging output that optimally charges the battery 191.

Battery charging algorithms 230 for charging batteries 191-193 can be specific to a particular battery. One charging algorithm might provide multiple modes of charging, such as recovery mode, charge mode, and maintenance mode. The algorithm may first enter recovery mode by pulsing energy until the battery voltage is greater than a predetermined value; then switch to full charge mode with a constant current or constant voltage until a predetermined battery voltage is obtained; and finally switch to maintenance mode, in which energy is pulsed at a low frequency. A charging algorithm for a different battery may provide two modes of charging, such as a fast charge mode combined with maintenance mode. The fast charge mode would provide a constant charging current or charging voltage until a predetermined battery voltage is obtained, then switch to maintenance mode in which energy is pulsed at a low frequency.

FIG. 3 demonstrates a method for charging a rechargeable battery 191 using a universal battery charger 100. Although presented here as a series of steps, the steps may be performed in any order. The method could also be performed with more or fewer steps. In step 310 the battery charger base 100 is connected to an AC power source via prongs 105. In step 320 a charging plug 165 is inserted into a device port 181. In step 330 an RFID antenna 161 on charging cord 155 receives tag information from RFID chip 184 on device 176. The tag information is used in step 340 to determine charging parameters for the battery 191. The parameters are selected based on the information received from RFID chip 184 in step 330. In step 342 a charging voltage for the battery 191 is selected. In step 344 a charging current for the battery 191 is selected. In step 346 a charging algorithm is selected. At least one of steps 342, 344, and 346 is performed, but not all of the steps 342, 344, 346 need be performed. In one embodiment the tag information 184 contains the charging parameters. In an alternative embodiment the tag information 184 is an identifier 201 that is used to search a look-up table to determine one or more of a charging current 210, a charging voltage 220, and a charging algorithm 230.

In step 350 the selected parameters are used to configure the voltage and current selector 131. In step 360, AC power is converted to DC power in the charging base. In step 370 a charging output is sent through charging cord 155 according to the charging parameters. In step 380 the battery 191 is charged.

The many features and advantages of the invention are apparent from the above description. Numerous modifications and variations will readily occur to those skilled in the art. Since such modifications are possible, the invention is not to be limited to the exact construction and operation illustrated and described. Rather, the present invention should be limited only by the following claims.

What is claimed is:

1. A universal battery charger for a battery-powered device, the device having a charging port and an RFID tag, the charger comprising:
   a) a power converter;
   b) a first charging selector connected to the power converter, the first charging selector regulating a charging output;
   c) a first charging cord having a first charging plug at an end of the first charging cord;
   d) a first RFID antenna at the end of the first charging cord; and
   e) a processor receiving first RFID tag information from the first RFID antenna and selecting, based on the first RFID tag information, a first charging output to be provided by the first charging selector to the first charging plug.

2. The charger of claim 1, wherein the first RFID tag information is a charging parameter, the charging parameter being one of a charging voltage, a charging current, and a charging algorithm to be output by the first charging selector.

3. The charger of claim 1, further comprising:
   f) a second charging selector connected to the power converter;
   g) a second charging cord having a second charging plug at an end of the second charging cord; and
   h) a second RFID antenna at the end of the second charging cord, the processor receiving second RFID tag information from the second RFID antenna and selecting, based on the second RFID tag information, a second charging output to be provided by the second charging selector to the second charging plug.

4. The charger of claim 1, further comprising:
   f) a memory storing a first battery identifier linked to a first charging parameter;
   wherein the first RFID tag information is the first battery identifier and the first charging parameter specifies the first charging output.

5. The charger of claim 4, further comprising:
   g) a second charging cord having a second RFID antenna at an end of the second charging cord;
   h) second RFID tag information received from the second RFID antenna;

i) a second battery identifier in the memory, the second battery identifier linked to a second charging parameter; wherein the second RFID tag information is the second battery identifier, and the second charging parameter specifies a second charging output.

6. The charger of claim 5, wherein the second charging output is output by a second charging selector connected to the power converter.

7. The charger of claim 5, wherein the first and second battery identifiers are each linked to charging parameters defining charging voltages, charging currents, and charging algorithms.

8. The charger of claim 4, wherein the first charging parameter includes one of a charging voltage, a charging current, and a charging algorithm.

9. The charger of claim 4, wherein the first battery identifier is linked to charging parameters defining a charging voltage, a charging current, and a charging algorithm.

10. A battery charging system for a battery-powered device, the system comprising:
   a) a first device having
      i) a first battery,
      ii) a first battery charging port, and
      iii) a first RFID tag with first RFID tag information; and
   b) a charging base having
      i) a power converter;
      ii) a first voltage-and-current selector connected to the power converter;
      iii) a first charging cord terminating in a first charging plug and a first RFID antenna, the first charging cord receiving a first charge output from the first voltage-and-current selector; and
      iv) a processor receiving the first RFID tag information from the first RFID tag through the first RFID antenna and selecting a first voltage and current to be output by the first charging plug to charge the first battery through the first charging port based on the first RFID tag information.

11. The system of claim 10, wherein a charging algorithm is selected based on the first RFID tag information.

12. The system of claim 10, further comprising:
   c) a second voltage-and-current selector connected to the power converter in the base;
   d) a second charging cord terminating in a second charging plug and a second RFID antenna, the second charging cord receiving a second charge output from the second voltage-and-current selector;
   e) a second device having
      i) a second battery,
      ii) a second battery charging port, and
      iii) a second RFID tag with second RFID tag information, the processor receiving the second RFID tag information through the second RFID antenna and selecting a second voltage and current to be output by the second charging plug to charge the second battery through the second charging port based on the second RFID tag information.

13. The system of claim 10, wherein the first RFID tag is attached to the device.

14. The system of claim 10, wherein the first RFID tag is attached to the battery.

15. The system of claim 10, wherein the first RFID tag information is one of a charging voltage, a charging current, and a charging algorithm to be output by the first charging port.

16. The system of claim 10, wherein the first RFID tag information is a battery identifier, and the selected first voltage and current are provided in a lookup table based on the battery identifier.

17. A method of charging a battery, the method comprising:
   a) inserting a charging plug, located on a first end of a charging cord, into a port on a device powered by a battery;
   b) reading RFID information from an RFID tag on the device using an RFID antenna located proximal to the first end of the charging cord;
   c) selecting a voltage and current to be output by the charging plug based on the RFID information; and
   d) supplying the voltage and current to the charging plug to charge the device battery.

18. The method of claim 17, wherein the RFID information is used to locate the selected voltage and current in a look-up table.

19. The method of claim 17, wherein the RFID antenna receives the RFID information from the RFID tag while the charging plug is being inserted into the port.

* * * * *

UNITED STATES PATENT AND TRADEMARK OFFICE
CERTIFICATE OF CORRECTION

PATENT NO. : 9,059,590 B2  
APPLICATION NO. : 13/777075  
DATED : June 16, 2015  
INVENTOR(S) : Timothy M. Cassidy Page 1 of 1

It is certified that error appears in the above-identified patent and that said Letters Patent is hereby corrected as shown below:

IN THE SPECIFICATION

Column 2, Line 49  
Delete "the of the" and insert --of the--, therefor.

Signed and Sealed this  
Fifth Day of July, 2016

Michelle K. Lee  
*Director of the United States Patent and Trademark Office*